US008595638B2

(12) United States Patent
Belitz et al.

(10) Patent No.: US 8,595,638 B2
(45) Date of Patent: Nov. 26, 2013

(54) USER INTERFACE, DEVICE AND METHOD FOR DISPLAYING SPECIAL LOCATIONS ON A MAP

(75) Inventors: Sanna Maarit Belitz, Helsinki (FI);
Jorma Tapio Suutarinen, Porvoo (FI);
Ari Pekka Hirvonen, Helsinki (FI)

(73) Assignee: Nokia Corporation, Espoo (FI)

( * ) Notice: Subject to any disclaimer, the term of this patent is extended or adjusted under 35 U.S.C. 154(b) by 936 days.

(21) Appl. No.: 12/200,413

(22) Filed: Aug. 28, 2008

(65) Prior Publication Data

US 2010/0058212 A1 Mar. 4, 2010

(51) Int. Cl.
*G06F 3/00* (2006.01)
*G06F 3/048* (2006.01)
*G06F 3/033* (2006.01)

(52) U.S. Cl.
USPC ............ 715/766; 715/835; 715/848; 715/863

(58) Field of Classification Search
USPC .................................. 715/766, 835, 848, 863
See application file for complete search history.

(56) References Cited

U.S. PATENT DOCUMENTS

| | | | | |
|---|---|---|---|---|
| 5,553,209 | A * | 9/1996 | Johnson et al. | 345/667 |
| 6,025,843 | A | 2/2000 | Sklar | |
| 6,308,177 | B1 * | 10/2001 | Israni et al. | 701/461 |
| 6,628,278 | B1 * | 9/2003 | Ritter | 345/419 |
| 6,963,294 | B2 * | 11/2005 | Kurosawa | 340/995.19 |
| 8,014,945 | B2 * | 9/2011 | Cooper et al. | 701/452 |
| 8,385,881 | B2 * | 2/2013 | Zhu et al. | 455/404.1 |
| 8,438,222 | B2 * | 5/2013 | Takakura et al. | 709/203 |
| 2003/0004638 | A1 | 1/2003 | Villers et al. | |
| 2003/0023374 | A1 | 1/2003 | Shimabara | |
| 2004/0098195 | A1 | 5/2004 | Listle et al. | |
| 2004/0243307 | A1 * | 12/2004 | Geelen | 701/213 |
| 2005/0169499 | A1 | 8/2005 | Rodriguez et al. | |
| 2007/0268310 | A1 * | 11/2007 | Dolph et al. | 345/629 |
| 2007/0279438 | A1 | 12/2007 | Takakura et al. | |
| 2009/0284551 | A1 * | 11/2009 | Stanton | 345/629 |

FOREIGN PATENT DOCUMENTS

JP 2007-212681 A 8/2007
RU 2265245 C2 11/2005

OTHER PUBLICATIONS

International Search Report and Written Opinion for International Application No. PCT/EP209/005745, mailed Nov. 19, 2009.
About Flickr; [online]; [Retrieved on Oct. 28, 2011]; Retrieved from the Internet <URL: http://http://web.archive.org/web/20080509201716/http://flickr.com/about/; 2 pages.
International Search Report and Written Opinion for Application No. PCT/EP2009/005745; dated Nov. 19, 2009.
Office Action for Korean Application No. 2011-7004588 dated Jun. 26, 2013.

* cited by examiner

*Primary Examiner* — David Phantana Angkool
(74) *Attorney, Agent, or Firm* — Alston & Bird LLP

(57) ABSTRACT

A user interface comprising a controller configured to display a map and to display at least one marked location on said map. The location is associated with at least one graphical object. The controller is further configured to determine whether a first graphical object will overlap a second graphical object when rendered and if so said controller is configured to create a third graphical object being associated with said first and second graphical objects and render said third graphical object.

19 Claims, 5 Drawing Sheets

USER INTERFACE, DEVICE AND METHOD FOR DISPLAYING SPECIAL LOCATIONS ON A MAP

FIELD

The present application relates to a user interface, a device and a method for showing locations on a map, and in particular to a user interface, a device and a method for showing clustered locations on a map.

BACKGROUND

More and more electronic devices such as computers, mobile phones, and Personal Digital Assistants (PDAs) are being used for navigation and general map browsing. It is common to mark special locations on a map by associating a graphical object with that location. Examples of such locations are service points, restaurants, tourist attractions, visited places etc and examples of graphical objects are photographs taken at such a location or an image of such a location. If many locations are located close to one another they overlap and the view of the associated images become cluttered and it is difficult to discern between the various objects and the user is not provided with a good view of what location is associated with what. Being able to clearly show the associated images for a cluster of locations thus become important. In prior art solutions, it has been known to provide such an overview by grouping closely located locations in clusters marked by a single object and as such an object is selected, the associated graphical objects are shown in a separate window.

Another solution has been to arrange the associated graphical objects in a row below or over the map. This does not provide the user with an overview of which graphical object is associated with which location exactly.

Thus it would be useful to be able to present a user with an overview of associated images to special locations which enables to user to clearly see the associations.

SUMMARY

On this background, it would be advantageous to provide a user interface, a device and a method that overcomes or at least reduces the drawbacks indicated above by providing a device configured to render graphical objects associated with a geographical location on a map by stacking the graphical objects if they overlap thus providing a clear view of the locations.

The disclosed embodiments provide a user interface comprising a controller configured to display a map and to display at least one marked location on said map, said location being associated with at least one graphical object wherein said controller is further configured to determine whether a first graphical object will overlap a second graphical object when rendered and if so said controller is configured to create a third graphical object or a graphical group object being associated with said first and second graphical objects and render said third graphical object.

The aspects of the disclosed embodiments are also directed to providing a user interface comprising means for displaying a map and for displaying at least one marked location on said map, said location being associated with at least one graphical object wherein said user interface further comprises means for determining whether a first graphical object will overlap a second graphical object when rendered and if so said user interface further comprises means for creating a third graphical object being associated with said first and second graphical objects and means for rendering said third graphical object.

In one embodiment of the above user interfaces the controller is configured to not render said first and second graphical object when the associated graphical object is rendered.

In one embodiment graphical object has a visual representation being displayed when rendered, said visual representation being an image.

In one embodiment the visual representation is indicative of the association between the graphical object and the location or of the marked location itself. This provides a user with an indication of what is special about the marked location.

In one embodiment the image is a minimization (for example a thumbnail) of a photograph. This provides a user with an indication of the content of the graphical object, i.e. the photograph, associated with the marked location.

In one embodiment the third graphical object's visual representation is a visual representation of a graphical object being associated with said third graphical object. This provides a user with an indication of what graphical objects are comprised in the third graphical object.

In one embodiment the controller is further configured to receive a selection command for a third graphical object and to display said visual representations of a first and a second graphical objects being associated with said third graphical object in response thereto. This allows a user to view the graphical objects associated with the marked locations without zooming in or out even if the locations or their images would overlap.

In one embodiment the controller is configured to display said visual representations of said associated graphical objects in a window and wherein said controller is further configured to display one of said visual representations of said associated graphical objects in a first size and the other of said visual representations of said associated graphical objects in a second size wherein said first size is larger than said second size. This provides the user with a preview of the associated images which can be scrolled through and each shown temporarily in a larger size. This provides a user with a quick and easy manner of viewing visual content associated with a location without additional zooming operations or selections or executions of additional applications.

In one embodiment the visual representation of a graphical object contains a number indicating the number of associated graphical objects. This gives a user an indication how many objects are associated with said object and if further investigations of said objects would provide additional information.

In one embodiment the association between a graphical object and a location exist in a correlation of geographical coordinates. This enables a photograph to be associated with the location in which it was taken and as a map is displayed all or a selected number of photographs stored in a device can thus be marked on the map to give a user an overview of the shown map area.

In one embodiment the controller is configured to determine whether a graphical object overlaps another graphical object by determining if said graphical objects' visual representations would overlap when rendered. This further improves the view of the map and the marked locations as it will be easy to see the associated graphical objects as none of their visual representations overlap.

The aspects of the disclosed embodiments are also directed to providing a device incorporating and implementing a user interface according to above.

The aspects of the disclosed embodiments are also directed to providing a method for displaying a map and special locations and associated graphical objects on a display comprising determining whether a first graphical object will overlap a second graphical object when both are rendered and if so create a third graphical object associated with both first and second graphical object and rendering said third graphical object.

The method above and the embodiments below share the advantages discussed above and below.

In one embodiment the method further comprises receiving a selection command for a third graphical object and displaying said visual representations of a first and a second graphical objects being associated with said third graphical object in response thereto.

In one embodiment the method further comprises determining whether a graphical object overlaps another graphical object by determining if visual representations of said graphical objects would overlap when rendered.

The aspects of the disclosed embodiments are also directed to providing a device incorporating and implementing a method according to above.

The aspects of the disclosed embodiments are also directed to providing a computer readable medium including at least computer program code for controlling a user interface comprising a display, said computer readable medium comprising software code for displaying a map and for displaying at least one marked location on said map, said location being associated with at least one graphical object, software code for determining whether a first graphical object will overlap a second graphical object when rendered and if so said creating a third graphical object being associated with said first and second graphical objects and for rendering said third graphical object.

The computer readable medium above and the embodiments below share the advantages discussed above and below.

In one embodiment the computer readable medium further comprises software code for receiving a selection command for a third graphical object and for displaying visual representations of a first and a second graphical objects being associated with said third graphical object in response thereto.

In one embodiment the computer readable medium further comprises software code for displaying said visual representations of said associated graphical objects in a window and comprising software code for displaying one of said visual representations of said associated graphical objects in a first size and the other of said visual representations of said associated graphical objects in a second size wherein said first size is larger than said second size.

In one embodiment the computer readable medium further comprises software code for determining whether a graphical object overlaps another graphical object by determining if visual representations of said graphical objects would overlap when rendered.

The aspects of the disclosed embodiments are also directed to providing a device incorporating and implementing a computer readable medium according to above.

In one embodiment of any of the devices above, the device is a mobile communications terminal, a mobile phone, a personal digital assistant (PDA), a navigation device, a camera, a computer or a laptop computer.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
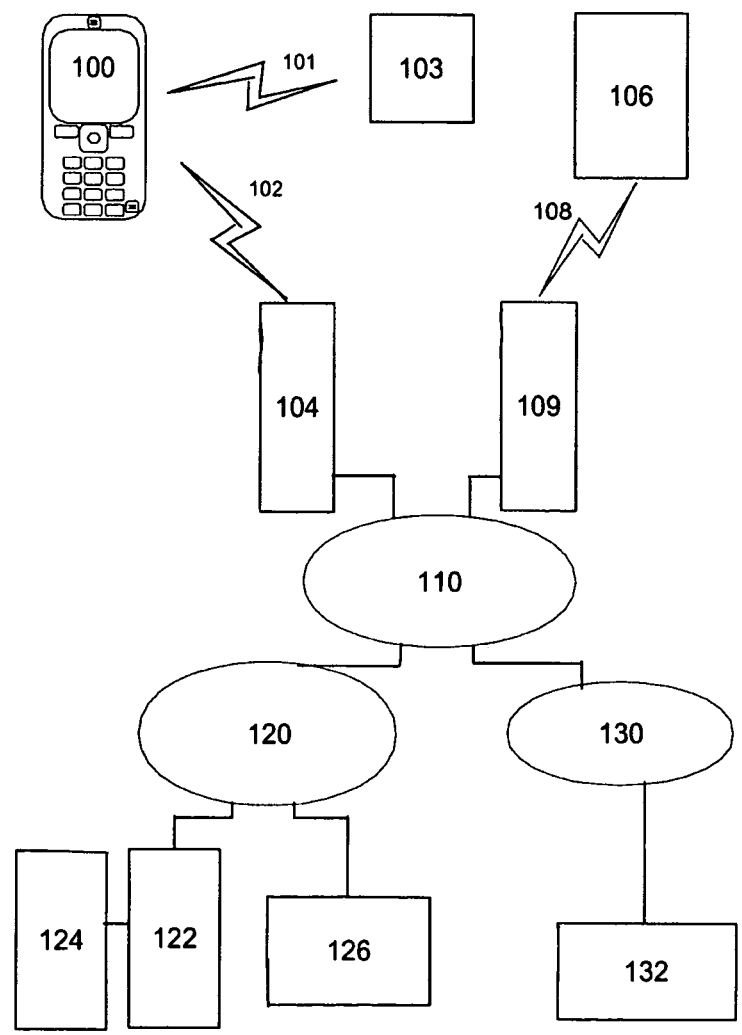
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency, RF links 102, 108 via base stations 104, 109. The mobile telecommunications network 110 may be in compliance with any commercially available mobile telecommunications standard, such as Group Spéciale Mobile, GSM, Universal Mobile Telecommunications System, UMTS, Digital Advanced Mobile Phone system, D-AMPS, The code division multiple access standards CDMA and CDMA2000, Freedom Of Mobile Access, FOMA, and Time Division-Synchronous Code Division Multiple Access, TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a World Wide Web (www) or Wireless Application Protocol (wap) server capable of serving www/wap content to the mobile terminal 100.

A public switched telephone network (PSTN) 130 is connected to the mobile telecommunications network 110 in a familiar manner. Various telephone terminals, including the stationary telephone 132, are connected to the PSTN 130.

The mobile terminal 100 is also capable of communicating locally via a local link 101 to one or more local devices 103. The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

Figure 2:
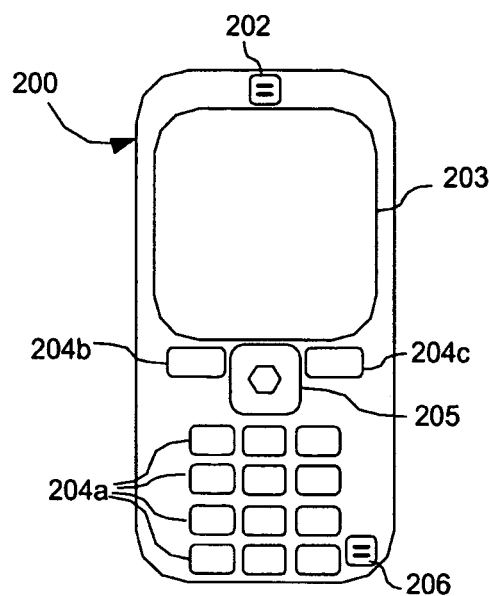
FIG. 2 is a plane front view of a device according to an embodiment.

An embodiment 200 of the mobile terminal 100 is illustrated in more detail in FIG. 2. The mobile terminal 200 comprises a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device.

Figure 3:
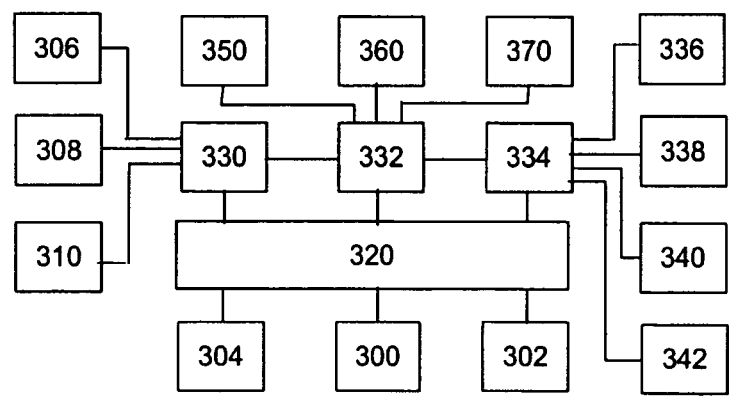
FIG. 3 is a block diagram illustrating the general architecture of a device of FIG. 2 in accordance with the present application, FIG. 4a, b and c are screen shots of a device according to an embodiment.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM) memory, Read Only memory (ROM) memory, Electrically Erasable Programmable Read-Only Memory (EEPROM) memory, flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a notepad application 360, as well as various other applications 370, such as applications for voice calling, video calling, sending and receiving Short Message Service (SMS) messages, Multimedia Message Service (MMS) messages or email, web browsing, an instant messaging application, a phone book application, a calendar application, a control panel application, a camera application, one or more video games, a notepad application, etc. It should be noted that two or more of the applications listed above may be executed as the same application The MMI 334 also includes one or more hardware controllers, which together with the MMI drivers cooperate with the first display 336/203, and the keypad 338/204 as well as various other Input/Output devices such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

It should be noted that although the device described above is a mobile phone the teachings herein can be applied equally well in other devices such as personal digital assistants, computers, laptop computers navigation devices such as hand held GPS (Global Positioning System) devices, other navigation devices such as radar monitors and cameras, both photographic and videographic cameras.

Figures 4A, 4B:
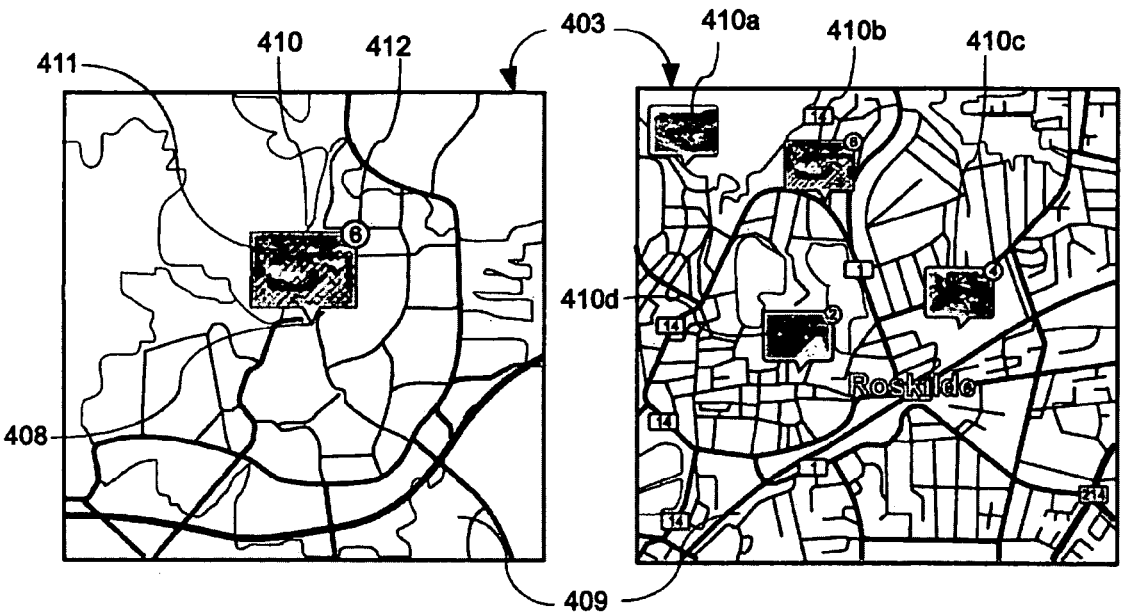

FIG. 4a is a screenshot of a display 403 of a device or a user interface according to the teachings herein. A map 409 is displayed of a town called Roskilde. A location 408 is marked by a graphical object 410. In this embodiment the location 408 is marked with an arrow on the graphical object 410 indicating the location 408 on the map 409.

The graphical object 410 has a visual representation 411 which in this embodiment is a photograph that is associated with the location. The nature of the association can vary and depend on various applications. Examples of associations are photographs that have been taken at those coordinates. Pictures that have been explicitly associated with the location, for example pictures of an apartment are associated with the location of the apartment or perhaps pictures of a person are associated with the address of that person. Another example is a trademark belonging to an establishment located at a specific location.

In one embodiment the visual representation 411 is indicative of the nature of the association with the marked location or of the marked location itself. This is the case when for example the visual representation 411 is a photograph of the location.

In this embodiment the graphical object 410 carries a number indicator 412 which presents a viewer with a number. The number indicates how many graphical objects 410 are associated with that location and are stacked into one graphical object 410. In this embodiment 13 graphical objects are stacked into one graphical object 410. The graphical objects stacked in the displayed graphical object or graphical group object 410 need not be associated with the same location, but can be associated with other locations that are in close proximity to the marked location 408. These locations may be so close that if the graphical objects associated with each location were to be displayed separately they would overlap which would clutter the view and be confusing to a user. Instead a controller (not shown) is configured to determine whether two graphical objects 410 would overlap when rendered on the display 403 and if so the two graphical objects are stacked or grouped into one graphical object 410. This third graphical object is then associated with either one of the graphical objects' locations or a location in between the two locations.

FIG. 4b is another screenshot of a display 403 of a device or a user interface according to the teachings herein. In this screenshot the map 408 has been zoomed in showing the area in greater detail. When displaying the zoomed in map 409 the controller is configured to determine whether the graphical objects overlap or not and in this embodiment the graphical object 410 displayed in FIG. 4a which comprised 13 other graphical objects has now been split up into 4 graphical objects 410a, 410b, 410c and 410d each consisting of 1, 6, 4 and 2 graphical objects respectively.

Should a user zoom out from FIG. 4b the display would return to the screenshot sown in FIG. 4a and the graphical objects 410a, 410b, 410c and 410d would again be determined to overlap and be stacked in a group graphical object 410.

In one embodiment the controller determines whether two graphical objects overlap by calculating whether the visual representations 411 of two graphical objects 410 would visually overlap when rendered on the display 403. In one embodiment two visual representations 411 are deemed to overlap even if they would no, but would be so closely displayed that it would still be perceived as cluttered by a user.

In one embodiment two graphical objects 410 are deemed to overlap if they are close to each other and would hide too much of the underlying map 409 when displayed in which case a user would not be able to see the map 409.

In one embodiment at least some of the graphical objects 412 are pictures associated with the same location.

Figure 4C:
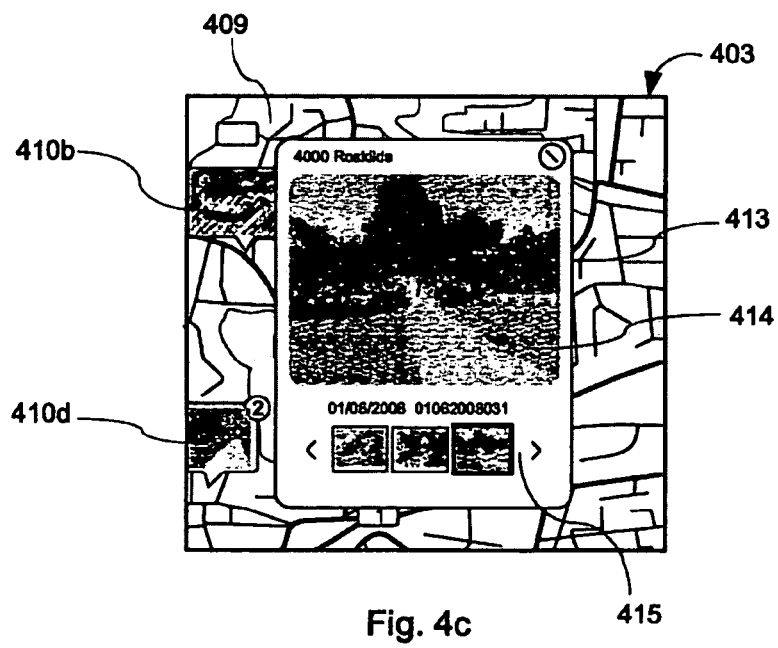

FIG. 4c is another screenshot of a display 403 of a device or a user interface according to the teachings herein. In this screenshot a graphical object 410c has been selected by a user, possibly by tapping on it with a stylus if the display 403 is a touch screen or by placing a cursor above it and clicking it. In this embodiment a popup window 413 is displayed over or instead of the graphical object 410c. The popup window shows at least some of the visual representations 411 of the graphical object 410c. One 414 of the visual representations 411 or images as they are in this embodiment is shown in a larger size than the others which are shown in a list 415. A user can easily scroll back and forth among these associated images and preview them in the popup window 413. In one embodiment the image can be opened in full size by clicking or double clicking or tapping on it which launches an image browsing or editing application.

In one embodiment the graphical objects 410 can be scrolled through by the controller receiving user input instructing it to do so, such as clicking on arrow or scroll keys or by clicking or tapping on a dedicated area on the graphical objects 410.

In one embodiment all graphical objects are photographs that are associated with the location where they were taken. The visual representations are thumbnails of the photographs. Photographs taken close by to each other are stacked together depending on the zoom level. If a user zooms in, the stacks will be split up and if the user zooms out the stacks will be merged.

In one embodiment the visual representations are always of the same size which provides a uniform and less confusing user interface view.

Figure 5:
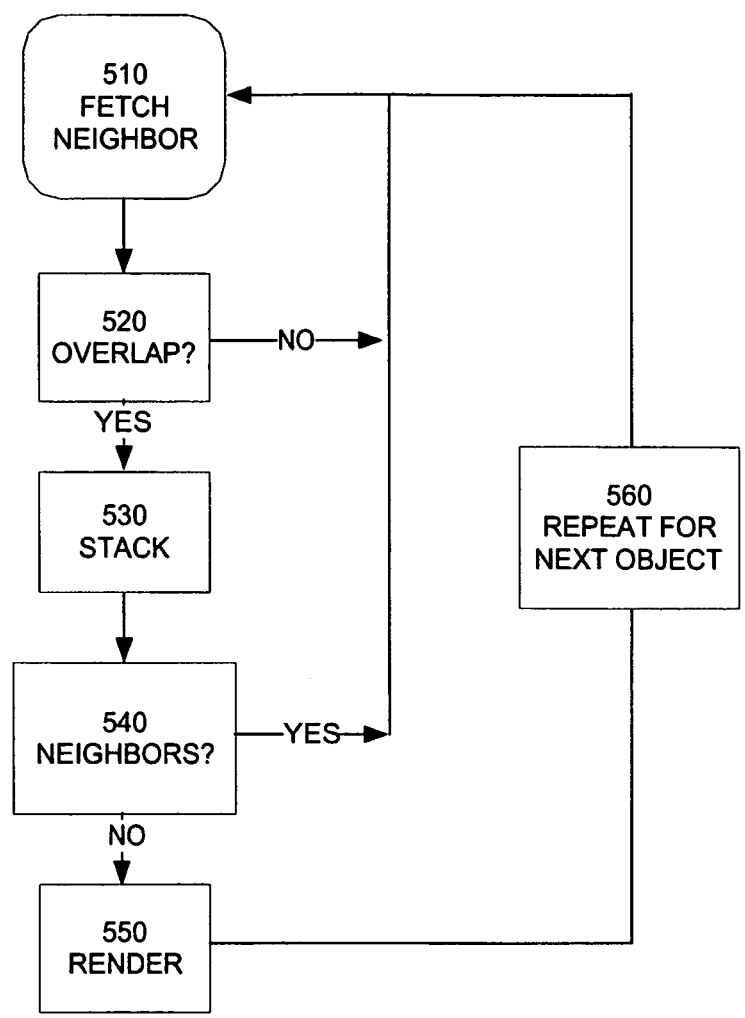
FIG. 5 is a flow chart describing a method according to an embodiment, and FIGS. 6a, b, c, d and e are diagrams showing how graphical objects are merged according to an embodiment.

FIG. 5 shows a flowchart of a method according to the teachings herein. The method is performed by a controller as a map is to be displayed.

The controller starts in step 510 by fetching a neighboring or second graphical object to a first graphical object. In one embodiment the graphical objects are stored in a memory structure according to their associated locations which simplifies the determination of which graphical objects are neighboring. In step 520 it is determined whether the rendering of the graphical object would result in an overlap the two graphical objects. If so, a third graphical object is created in step 530. The controller then checks whether there are any neighboring graphical objects to the third graphical object in step 540. If not, the third graphical object is rendered on the display in step 550. If there are neighboring graphical objects the controller returns to step 510. As a graphical object has been rendered the controller continues with the next graphical object in a step 560 until all graphical objects have been investigated and either rendered or stacked with a second graphical object in a third graphical object.

It should be understood that the graphical objects comprising stacked graphical objects need not be recreated for each rendering of the map view. They can be maintained as they are if it is determined that the graphical objects stacked still overlap.

Also as two graphical objects each containing stacked graphical objects are to be merged into one stacked graphical object these two graphical objects can be deleted and their respective stacked graphical objects be merged into one graphical object.

Figure 6A:
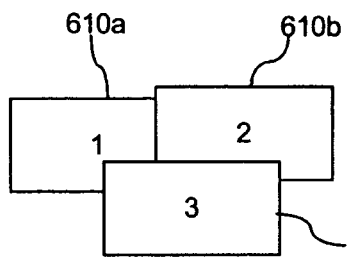
Figure 6B:
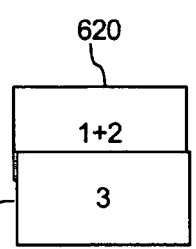
Figure 6C:
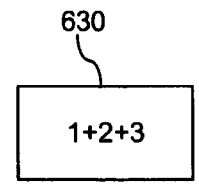

To illustrate further FIG. 6a shows three graphical objects that all overlap one another. Starting with a graphical object marked "1" 610a the controller (not shown) determines that it is overlapping a graphical object marked "2" 610b. A new graphical object marked "1+2" 620 is thus created incorporating the first and second graphical objects 610a and 610b, see FIG. 6b. The controller then determines whether the new graphical object marked "1+2" 620 overlaps another graphical object and as it overlaps the graphical object marked "3" 610c a new graphical object marked "1+2+3" 630 is created incorporating the graphical objects 620 and 610c and thus incorporating all three graphical objects 610a, 610b and 610c, see FIG. 6c. As no more graphical objects overlap the third graphical object 630 is displayed or rendered on a screen (not shown).

Figure 6D:
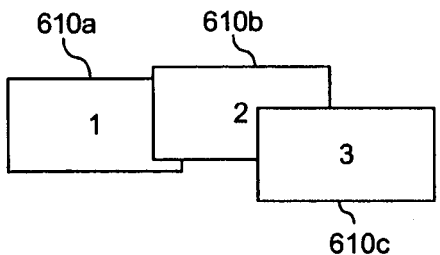
Figure 6E:
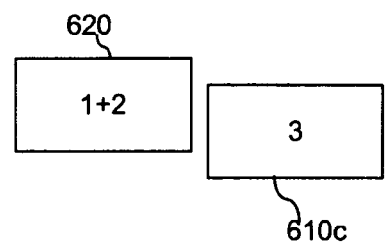

FIG. 6d shows another situation in which three graphical objects all overlap one another. Starting with a graphical object marked "1" 610a the controller (not shown) determines that it is overlapping a graphical object marked "2" 610b. A new graphical object marked "1+2" 620 is thus created incorporating the first and second graphical objects 610a and 610b, see FIG. 6e. The controller then checks whether the new graphical object marked "1+2" 620 overlaps another graphical object and as it does not overlap any other graphical object the two graphical objects 620 and 610c are displayed or rendered on a screen (not shown).

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, MP3 players, personal organizers or any other device designed for providing information while maintaining low power consumption.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user will be provided with an overview of special locations marked on a map which overview is not cluttered by clusters of locations.

Another exemplary advantage of the teaching of the present application is that the need for zooming and scrolling actions is greatly reduced which makes the user interface and a device incorporating such a user interface less time-consuming and confusing to use.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising a processor and a memory including computer program code, the memory and the computer program code configured to, with the processor, cause the apparatus to:
    determine whether graphical objects to be displayed on a map at a given zoom level will overlap when rendered when the map is displayed at said given zoom level;
    cause stacking of at least some of the graphical objects that have been determined to overlap at the given zoom level to create a further graphical object representing and enabling identification at said given zoom level of the at least some of the stacked graphical objects;
    cause display of the further graphical object representing and enabling identification at said given zoom level of the at least some of the stacked graphical objects and display of other graphical objects;
    cause changing of said given zoom level to a further zoom level that is more zoomed in than the given zoom level; and
    cause splitting up of the further graphical object representing and enabling identification at said given zoom level of the stacked graphical objects into a plurality of second further graphical objects that do not overlap with each other or with other graphical objects at said further zoom level.

2. An apparatus according to claim 1 wherein a graphical object has a visual representation being displayed when rendered, said visual representation being an image.

3. An apparatus according to claim 2 wherein said image is a minimization (thumbnail) of a photograph.

4. An apparatus according to claim 1 wherein said further graphical object's visual representation is a visual representation of a graphical object being associated with said further graphical object.

5. An apparatus according to claim 2 wherein said controller is further configured to receive a selection command for the further graphical object and to cause display of said visual representations of graphical objects being associated with said further graphical object in response thereto.

6. An apparatus according to claim 5 wherein the memory and the computer program code are further configured to, with the processor, cause the apparatus to cause display of said visual representations of said associated graphical objects in a window and cause display of one of said visual representations of said associated graphical objects in a first size and the other of said visual representations of said associated graphical objects in a second size wherein said first size is larger than said second size.

7. An apparatus according to claim 2 wherein said visual representation of a graphical object contains a number indicating the number of associated graphical objects.

8. An apparatus according to claim 1 wherein said association between a graphical object and a location exist in a correlation of geographical coordinates.

9. An apparatus according to claim 1 wherein the memory and the computer program code are further configured to, with the processor, cause the apparatus to determine whether a graphical object overlaps another graphical object by determining if said graphical objects visual representations would overlap when rendered.

10. A method comprising;
    determining, by a processor, whether graphical objects to be displayed on a map at a given zoom level will overlap when rendered when the map is displayed at said given zoom level;
    causing stacking of at least some of the graphical objects that have been determined to overlap at the given zoom level to create a further graphical object representing and enabling identification at said given zoom level of the at least some of the stacked graphical objects;
    causing display of the further graphical object representing and enabling identification at said given zoom level of the at least some of the stacked graphical objects and display of other graphical objects;
    causing changing of said given zoom level to a further zoom level that is more zoomed in than the given zoom level; and
    causing splitting up of the further graphical object representing and enabling identification at said given zoom level of the stacked graphical objects into a plurality of second further graphical objects that do not overlap with each other or with other graphical objects at said further zoom level.

11. A method according to claim 10 further comprising receiving a selection command for the further graphical object and causing display of said visual representations of graphical objects being associated with said further graphical object in response thereto.

12. A method according to claim 10 further comprising determining whether a graphical object overlaps another graphical object by determining if visual representations of said graphical objects would overlap when rendered.

13. An apparatus configured to implement a method according to claim 10.

14. Computer program product comprising a non-transitory computer readable medium having program code portions stored thereon, the program code portions being a computer readable medium and configured when said program product is run on a computer or network device, to:
    determine whether graphical objects to be displayed on a map at a given zoom level will overlap when rendered when the map is displayed at said given zoom level;
    cause stacking of at least some of the graphical objects that have been determined to overlap at the given zoom level to create a further graphical object representing and enabling identification at said given zoom level of the stacked graphical objects;

cause display of the further graphical object representing and enabling identification at said given zoom level of the at least some of the stacked graphical objects and display of other graphical objects;

cause changing of said given zoom level to a further zoom level that is more zoomed in than the given zoom level; and cause splitting up of the further graphical object representing and enabling identification at said given zoom level of the stacked graphical objects into a plurality of second further graphical objects that do not overlap with each other or with other graphical objects at said further zoom level.

15. A computer program product as in claim 14, wherein the program code portions are further configured, when said program product is run on a computer or network device, to receive a selection command for the further graphical object and cause displaying of visual representations of graphical objects being associated with said further graphical object in response thereto.

16. A computer program product as in claim 14, wherein the program code portions are further configured, when said program product is run on a computer or network device, to cause displaying of said visual representations of said associated graphical objects in a window and cause displaying of one of said visual representations of said associated graphical objects in a first size and the other of said visual representations of said associated graphical objects in a second size wherein said first size is larger than said second size.

17. A computer program product as in claim 14, wherein the program code portions are further configured, when said program product is run on a computer or network device, to determine whether a graphical object overlaps another graphical object by determining if visual representations of said graphical objects would overlap when rendered.

18. An apparatus configured to implement a computer program product according to claim 14.

19. An apparatus comprising:

means for determining whether graphical objects to be displayed on a map at a given zoom level will overlap when rendered when the map is displayed at said given zoom level;

means for causing stacking of at least some of the graphical objects that have been determined to overlap at the given zoom level to create a further graphical object representing and enabling identification at said given zoom level of the at least some of the stacked graphical objects;

means for causing display of the further graphical object representing and enabling identification at said given zoom level of the at least some of the stacked graphical objects and display of other graphical objects;

means for causing changing of said given zoom level to a further zoom level that is more zoomed in than the given zoom level; and means for causing splitting up of the further graphical object representing and enabling identification at said given zoom level of the stacked graphical objects into a plurality of second further graphical objects that do not overlap with each other or with other graphical objects at said further zoom level.

* * * * *